United States Patent [19]
Erstad

[11] Patent Number: 5,718,458
[45] Date of Patent: Feb. 17, 1998

[54] HIGH PRESSURE FLUID CONNECTOR

[75] Inventor: Jostein Erstad, Bergen, Norway

[73] Assignee: Framo Engineering AS, Nesttun, Norway

[21] Appl. No.: 559,581

[22] Filed: Nov. 16, 1995

[30] Foreign Application Priority Data

Nov. 1, 1995 [GB] United Kingdom ............ 9522327

[51] Int. Cl.$^6$ .................................................. F16L 17/10
[52] U.S. Cl. ............................. 285/96; 285/94; 285/98; 285/110; 285/351; 285/422; 285/136
[58] Field of Search ........................ 285/136, 96, 94, 285/98, 110, 351, 422

[56] References Cited

U.S. PATENT DOCUMENTS

| | | | |
|---|---|---|---|
| 2,577,858 | 12/1951 | Sampson | 285/136 X |
| 3,687,465 | 8/1972 | Grime et al. | 277/188 |
| 3,874,678 | 4/1975 | Potter | 277/29 |
| 4,111,467 | 9/1978 | de Fremery | 285/136 |
| 4,602,806 | 7/1986 | Saliger | 285/136 X |
| 4,647,076 | 3/1987 | Pollack et al. | 285/95 |
| 4,647,077 | 3/1987 | Ethridge | 285/136 X |
| 4,662,657 | 5/1987 | Harvey et al. | 285/96 |
| 4,683,912 | 8/1987 | Dubrosky | 285/136 X |
| 4,928,997 | 5/1990 | Reisener | 285/136 X |
| 5,056,719 | 10/1991 | Lauter et al. | 285/136 X |
| 5,199,748 | 4/1993 | Jung et al. | 285/136 |

FOREIGN PATENT DOCUMENTS

| | | |
|---|---|---|
| 0 214 811 | 3/1987 | European Pat. Off. |
| 2 026 638 | 2/1980 | United Kingdom |
| 2 041 467 | 9/1980 | United Kingdom |
| 2 178 492 | 2/1987 | United Kingdom |
| 2 213 545 | 8/1989 | United Kingdom |
| WO 86/00972 | 2/1986 | WIPO |
| WO 95/02145 | 1/1995 | WIPO |

*Primary Examiner*—Dave W. Arola
*Attorney, Agent, or Firm*—Foley & Lardner

[57] ABSTRACT

A connector arranged for high pressure fluid carrying conduits comprises a central core having at least one fluid passage such as an integral bore, formed therein and an outer member surrounding the central core and being moveable relative thereto. The outer member comprising at least one segment having a fluid flow conduit and sealing means for the connector junction comprising an intermediate member, at least one static seal for non-moveable surfaces and at least one dynamic seal for relatively moveable surface.

A plurality of segments may be stacked on top of each other and held together by the application of a compression force on shoulders of the segments.

A relative rotational capability is preserved for the parts of the connector yet a more reliable and versatile connector is achieved in which the modular construction allows a variety of sizes to be offered more easily and cheaply and engineering tolerances can be more easily be met than with a single piece construction.

20 Claims, 6 Drawing Sheets

HIGH PRESSURE FLUID CONNECTOR

FIELD OF THE INVENTION

The present invention relates to a high pressure fluid connector.

Such connectors are needed for example in transferring oil or gas from offshore drilling installations onto transport vessels.

The connectors may be a part of floating buoys carrying the riser from the undersea extraction point to which an oil tanker links up to load the oil or gas. Alternatively the connector may be fixed on the deck of the transport vessel. It is also possible say for one part of the connector to be on the vessel and the other part to be in the floating buoy.

Relative movement between the parts of the connector is important for such applications to allow for relative movement of the vessel and the riser in strong winds, high waves or influential currents.

A relative rotational capability is particularly advantageous and the connector may form a swivel joint between conduits. Of course such a swivel joint presents difficulties with regard to ensuring correct and accurate alignment of the ends of corresponding fluid conduits and in sealing the conduit join against leakage.

Reference of Copending Applications

Reference is hereby made to applicant's own copending applications covering related subject matter the content of which is incorporated herein by reference:

U.S. application claiming priority from UK application 9522326.9 filed 1 Nov. 1995 entitled "Sealing Arrangement" (agent's reference FD37/PL77262GB).

U.S. application claiming priority from UK application 9522325.1 filed 1 Nov. 1995 entitled "Fluid Flow Connector" (agent's reference FD39/PL77264GB).

U.S. application claiming priority from UK application 9522340.0 filed 1 Nov. 1995 entitled "Monitoring System for High Pressure Fluid Flow Connector" (agent's reference FD40/PL77265GB).

BACKGROUND OF THE INVENTION

One known FLUID flow connector is described in U.S. Pat. No. 4,828,292 and comprises two concentric hollow cylindrical parts, relatively rotatable with respect to each other and having cooperating aligned annular channels to form circumferential passages within the connector delimited by facing walls of the two parts. Inlet and outlet pipes are welded to the inner and outer cylindrical parts as appropriate to connect with the annular circumferential passages. In this way, even with rotational movement of the two parts, the inlet and outlet pipes communicate at all times via the annular passages. Annular ring seals are incorporated on each side of the passages and may be pressurised by a barrier fluid.

However, this known design is difficult and expensive to manufacture with sufficiently accurate tolerances, the welded joints are often prone to failure particularly under the high pressures and in the dirty environment of oil and gas production facilities, and it is a permanent structure once manufactured i.e. it cannot easily be connected and disconnected even for routine maintenance and repair. In addition, the seals are subject to a high degree of wear and experience attendant high failure rates.

It is the object of the invention to provide an improved fluid connector.

SUMMARY OF THE INVENTION

Accordingly the present invention provides an arrangement for connecting high pressure fluid-carrying conduits, the arrangement comprising a central core having a fluid passage formed therein and an outer member surrounding the central core and being moveable relative thereto, the outer member comprising at least one segment having a fluid flow conduit communicating with the fluid passage, there being sealing means for sealing the junction between the conduit and the passage in the central core against leakage of production fluid, the sealing means comprising an intermediate member, at least one static seal sealing the intermediate member to the core and at least one dynamic seal interposed between relatively moveable surfaces of the core and the outer member.

Preferably the sealing means is constructed according to the invention described in applicant's co-pending simultaneously filed U.S. application deriving from U.K. application 9522326.9 entitled "Sealing Arrangements" and having the reference FD37/PL77262GB.

A plurality of segments may be stacked on the central core and connected in a manner which allows some relative movement between them. They may be retained in relative juxtaposition by applying a compression force to the stack, e.g. by a compression nut. The force is taken by shoulder portions of the segments positioned adjacent the central core.

An arrangement according to the present invention is more reliable and versatile than known connector arrangements and its modular construction allows for a variety of sizes of connector to be built to order relatively easily. The modular structure also makes it easier to meet the strict engineering tolerances required in this field, compared to the single piece construction.

The use of axial bores as fluid conduits in the central core is also an advantage and particularly the arrangement described in applicant's co-pending and co-filed U.S. application deriving from U.K. application 9522325.1 entitled "High Pressure Fluid Connector" (Ref.FD38/PL77263GB).

A monitoring systems for the sealing means of the connector may be incorporated, preferably as described in applicant's co-pending co-filed U.S. application deriving from U.K. application 9522340.0 (Ref. FD40/PL77265GB).

DETAILED DESCRIPTION

Figure 1:
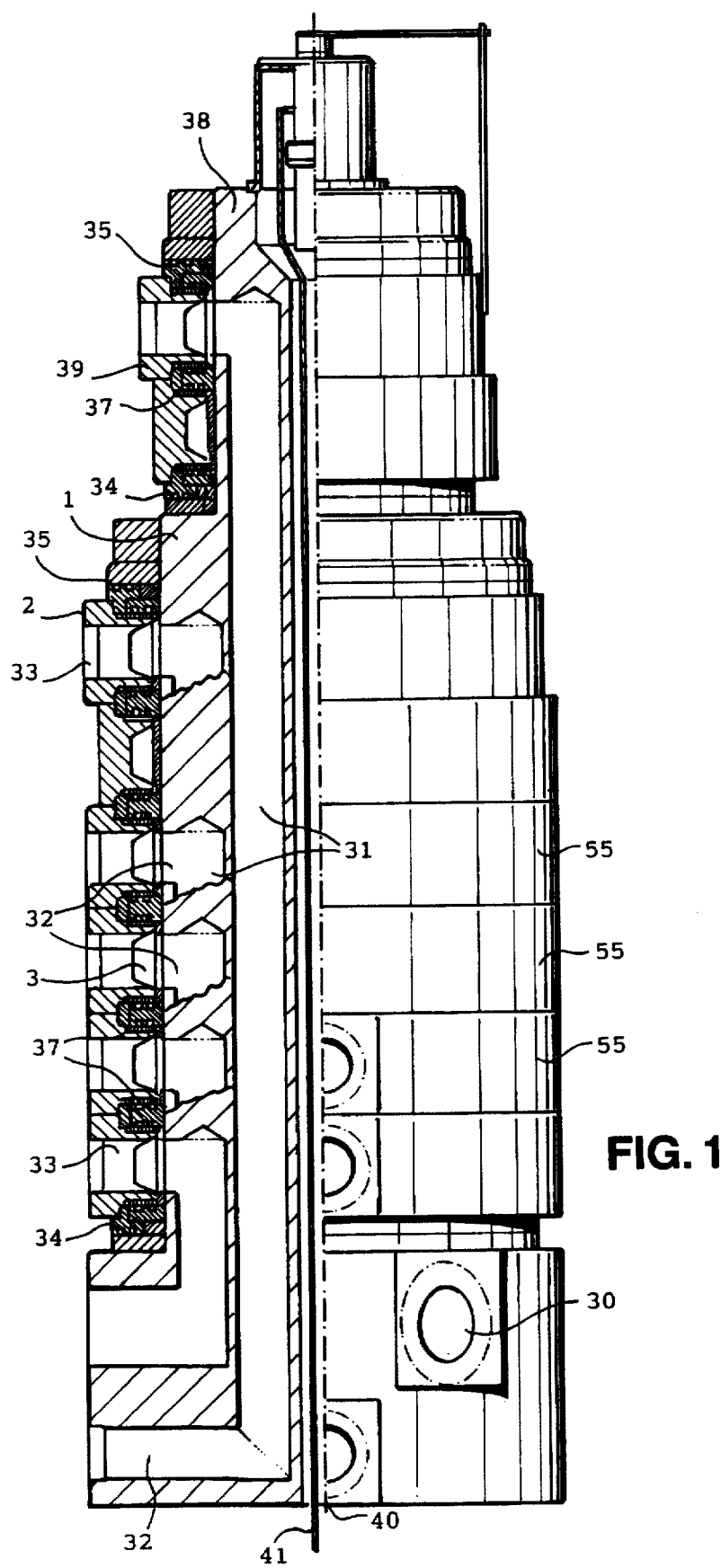
FIG. 1 shows a fluid connector arrangement according to one embodiment of the present invention, in part cross-section and in part elevational view.

FIG. 1 illustrates a high pressure fluid connector. In the left half of the Figure a cross-sectional view is shown. In the cross-sectional view, oppositely directed cross-hatching is used to indicate parts of the connector which are relatively rotational with respect to each other. Thus a male member 1 is denoted by a left to right rising cross-hatching and a female member 2 is denoted by left to right falling cross-hatching. The male member 1 is generally held stationary, for example on a storage or transport vessel to which the oil or gas is being pumped through the connector.

The male core member 1 has several axial bores 31 connecting radial passageways 32 in core element 1 each of which connect with fluid conduits 33 in the female member 2. The junction of these fluid conduits with the radial passageways 32 in male member 1 is formed as an annular groove 3. In this way the relative rotation of the two members 1 and 2 does not affect the fluid connection between the two.

This junction of the fluid conduits and the passageways is sealed by means of over-pressure double sealing arrangements above and below each junction, coaxial with the annual grooves. These sealing arrangements are indicated generally at 37 and are described in more detail with reference to FIG. 4 and also in applicant's co-pending and simultaneously filed British Application No. 9522326.9 entitled "Sealing Arrangement" (Agent's Ref. FD37/PL77262GB).

This sealing arrangement comprises sealing rings in the form of double pairs of lip-seals each having U-shaped cross-sections and being activated by a high pressure barrier fluid applied to the open side of the U-shape. The barrier fluid is supplied at a higher pressure to the pressure of the fluid in the conduit and provides a lubrication for the seal to facilitate relative rotation of the members 1 and 2 with a minimum of wear on and damage to the seal.

Such a sealing arrangement is provided in each of the segments 55 of the outer member 2, above and below each annular groove 3.

At the top and bottom of the stack of the segments 55 is provided an environment seal 34, 35 which seals the set of segments and their fluid carrying conduits against the atmosphere. The environment seals each comprises a pair of spaced U-shaped seals activated by pressure differentials in a similar manner to the dynamic lip seals above and below each annular groove.

In the embodiment shown in FIG. 1 the core element 1 comprises an additional extension portion 38 extending longitudinally beyond female member 2, and having a smaller diameter. This connects with a second female member 39 in the same way as has been described in relation to the first female member 2. That is to say that sealing arrangements 37 as well as environment seal 34, 35 are provided. Such a narrower diameter core extension is useful for particularly high pressure fluid flow.

A central axial bore 40 in core 1 carries electrical wires 41 (FIG. 1) and/or other support lines and power supplies for the connector and the pipeline.

Figure 2:
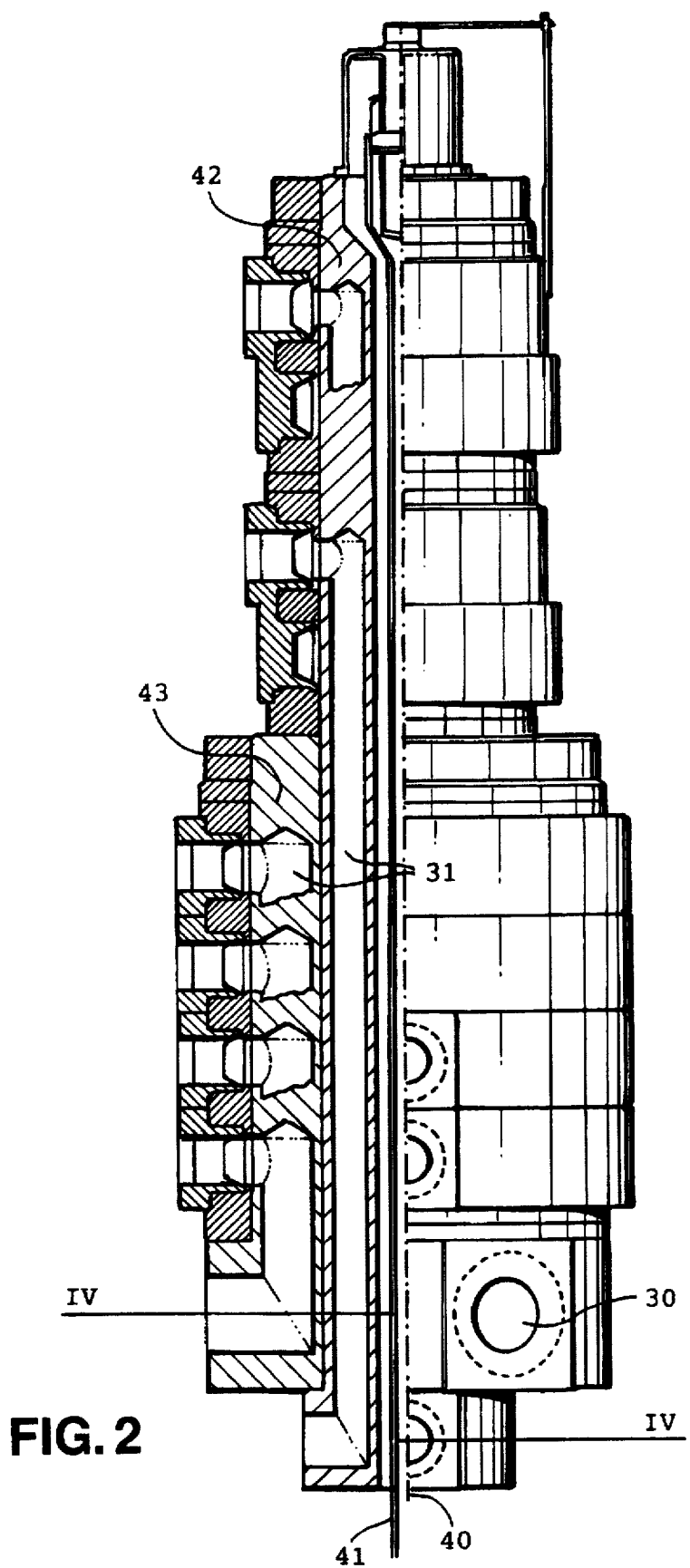
FIG. 2 shows a fluid connector arrangement according to a second embodiment of the present invention, in part cross-section and in part elevational view.

FIG. 2 shows an alternative arrangement to that of FIG. 1 where the arrangement is identical except that the male member 1 takes the form of an outer core member 43 and an inner core member 42 which fits coaxially into the outer core element 43. All other components are denoted by like reference numbers.

This embodiment has advantages in the manufacture of the arrangement since the concentric cores can be made independently and assembled after machining, leading to reduced manufacturing costs, more accurate tolerances and allowing larger diameter fluid connectors to be constructed than would otherwise be possible. In addition, each core element may be made of a different material which may be chosen according to the fluid to be transported in the particular section. For example a particularly corrosive production fluid may require to be transported in conduits of a strong corrosion-resistant material which may be prohibitively expensive if used for the whole core. With this embodiment however, only one part of the core need use such expensive material.

The inner core member 42 has axial bores 31a of a smaller diameter to those in the outer core element. These bores 31a communicate fluidly in pairs with radial passageways 32a. Each set of axial bores is arranged in a ring.

This arrangement improves the capacity of the connector to carry many different fluids simultaneously and independently since it provides the possibility to provide a larger number of bores in the central core. Also bores of different diameters for different fluid flows can be made more easily. Smaller diameter bores are generally used for higher pressure fluid conduits.

Figure 3:
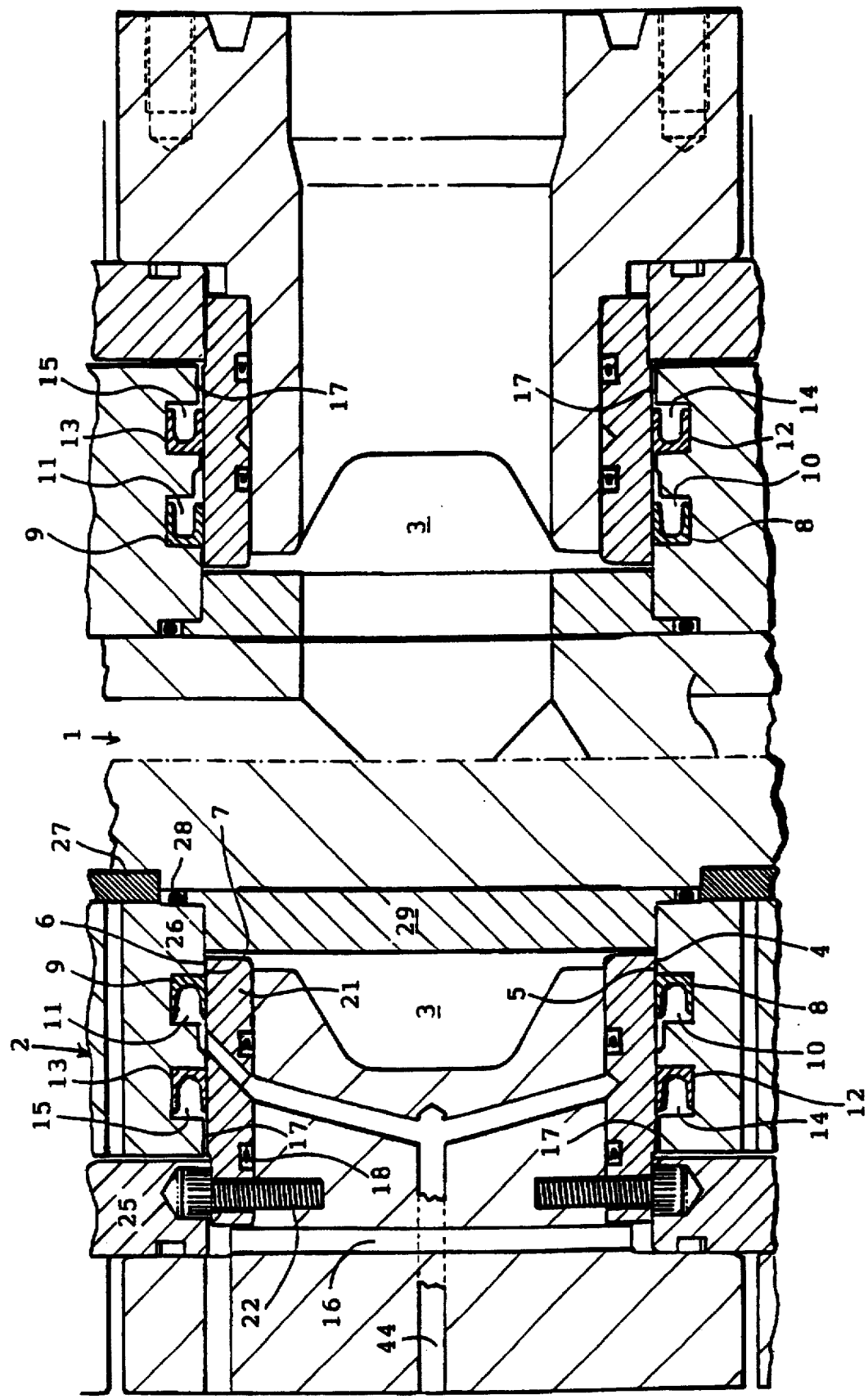
FIG. 3 is a cross-sectional view of a single segment of the fluid connector of FIG. 1.

FIG. 3 illustrates a segment 55 of the connector of FIG. 1 showing joint between fluid conduits. The conduits are joined so as to allow a relative rotation of parts at the joint and for ease of reference those parts which move relative to each other are denoted by oppositely directed cross-hatching. In the specific embodiment shown in FIG. 3, a core swivel member 1, denoted by left to right rising cross-hatching is a stationary male member whereas the connecting member 2, denoted by left to right falling cross-hatching is a female member which is rotatable about member 1. Axial bores (shown in FIG. 1) in male member 1 are connected via radial passages (shown in FIG. 1) to annular grooves 3 forming a junction of the male and female members 1 and 2. These annular grooves 3 connect with passageways (shown in FIG. 1) in the female member 2 so that fluid such as oil or gas can be transferred, for example from an oil pipeline riser to a transport vessel such as an oil tanker.

In the embodiment shown in FIG. 3, surfaces which are moveable relative to each other are indicated by the junction of opposite cross-hatching. Hence it can be seen that the surfaces 4 and 6 of male member 1 move relative to the surfaces 5 and 7 respectively of female member 2. In order to allow for relative rotation of the members 1 and 2, there must be a small clearance between these relatively moveable surfaces and this provides a potential fluid leakage path for the production fluid from the conduits and in particular from the annular groove 3.

Thus, a sealing arrangement is incorporated to seal this small clearance gap. In particular a pair of primary lip seals 8, 9 with U-shaped cross sections are arranged in respective channels 10, 11 above and below the annular groove 3. These primary seals are pressurised by a barrier fluid supplied via a supply channel 44 in female member 2. The supply channel branches to provide barrier fluid into each of the grooves 10, 11 to pressurise the primary seals 8, 9. The barrier fluid through channel 44 is supplied at a pressure slightly above the pressure of the production fluid in the annular channel 3 and thus the arms of each of the U-shaped sealing rings 8, 9 are forced against respective relatively moveable surfaces and retain the production fluid within channel 3.

Typically the pressure of the production fluid, e.g. gas or oil, may be of the order of 500 bar and the barrier fluid would preferably be under a pressure of around 520 bar. These values are given by way of example only and are in no way intended to be limiting on the pressure which could be used in a sealing arrangement according to the present invention which would be chosen by a person skilled in the art according to the particular circumstances and requirements of the apparatus.

To improve the efficiency of the seal, at least one of each adjoining surface (4/5 or 6/7) is coated with a hard smooth coating such as tungsten carbide. In general it is easier to provide such a coating onto a predominantly flat surface and thus in the embodiment illustrated this coating would be on surfaces 5 and 7. The material of the sealing rings 8, 9 is preferably a plastics material thus providing a relative soft member to seal against the hard smooth surface of tungsten carbide to provide an efficient seal.

In practice, because the barrier fluid in channel 44, and in grooves 10, 11, is at a higher pressure to the production fluid against which sealing is being effected, so that any net flow would be from the barrier fluid channel into the production fluid conduit. Thus in practice the barrier fluid effectively lubricates the sealing rings 8, 9 and facilitates the relative movement between the sliding surfaces. An extremely small net fluid loss of the barrier fluid will be experienced but this is insignificant compared to the many millions of gallons of product which would usually flow through the conduits across the joint, and is of course preferable to leakage in the opposite direction which would happen if the primary seal were not an overpressure seal.

A secondary seal for the joint is provided in the form of secondary sealing rings 12 and 13 seated in channels 14 and 15 of surfaces 4 and 6 respectively.

These secondary channels 14 and 15 are spaced from the primary channels 10 and 11 and are also provided with a barrier fluid under pressure via supply channel 16 located within the female member 2. The barrier fluid for the secondary seals 12 and 13 forms part of a separate supply circuit to that for the primary seals 8 and 9 and thus channel 16 is not connected to channel 44. However the barrier fluid for the secondary sealing rings 12 and 13 is supplied at the same pressure as the barrier fluid for the primary sealing rings 8 and 9. Therefore the same barrier fluid pressure is applied to both sides of each of the secondary sealing rings 12 and 13 then the secondary sealing rings are not activated under normal usage conditions when the primary sealing rings are intact).

In the embodiment shown a bearing is provided between relatively rotatable surfaces 6, 7 and 4, 5 respectively. This may be a sliding bearing as shown at 17 in FIG. 1 or alteratively a roller bearing.

In the embodiment of FIG. 3 many static seals are also shown. These are provided to lock various parts or elements together and may comprise U-shaped cross-sectional seals as denoted by 18 or O-ring seals 19 with back-up plates 20.

The back-up plate in the O-ring seals 19 prevents extrusion of the seal through the gap between the surfaces being sealed, which otherwise does tend to occur under high pressure.

The U-shaped static seals 18 are provided in grooves in a sealing surface element 21 to hold it to the main body of female member 2. Bolts 22 are also arranged to hold these elements together. The head of the bolt sits in a recess 24 in a connecting member 25 which serves to fasten this segment of female member 2 to an adjacent similar segment. The connecting member 25 is further attached to the female member by static seals formed of O-rings 19 and back-up plates 20.

The primary and secondary sealing ring channels are formed in an intermediate member 26 which is fixed to the male member 1 by means of a key 27 and static seals 28.

A distance ring surrounds the male member 1. The arrangement of FIG. 3 is repeated in a stack of modules as shown in FIGS. 1 and 2. Each module may carry fluids of different types or fluids in different directions. The distance ring 29 has shoulders which abut adjacent corners of the intermediate members 26 to take the compression forces holding the stacked segments or modules together.

Figure 4:
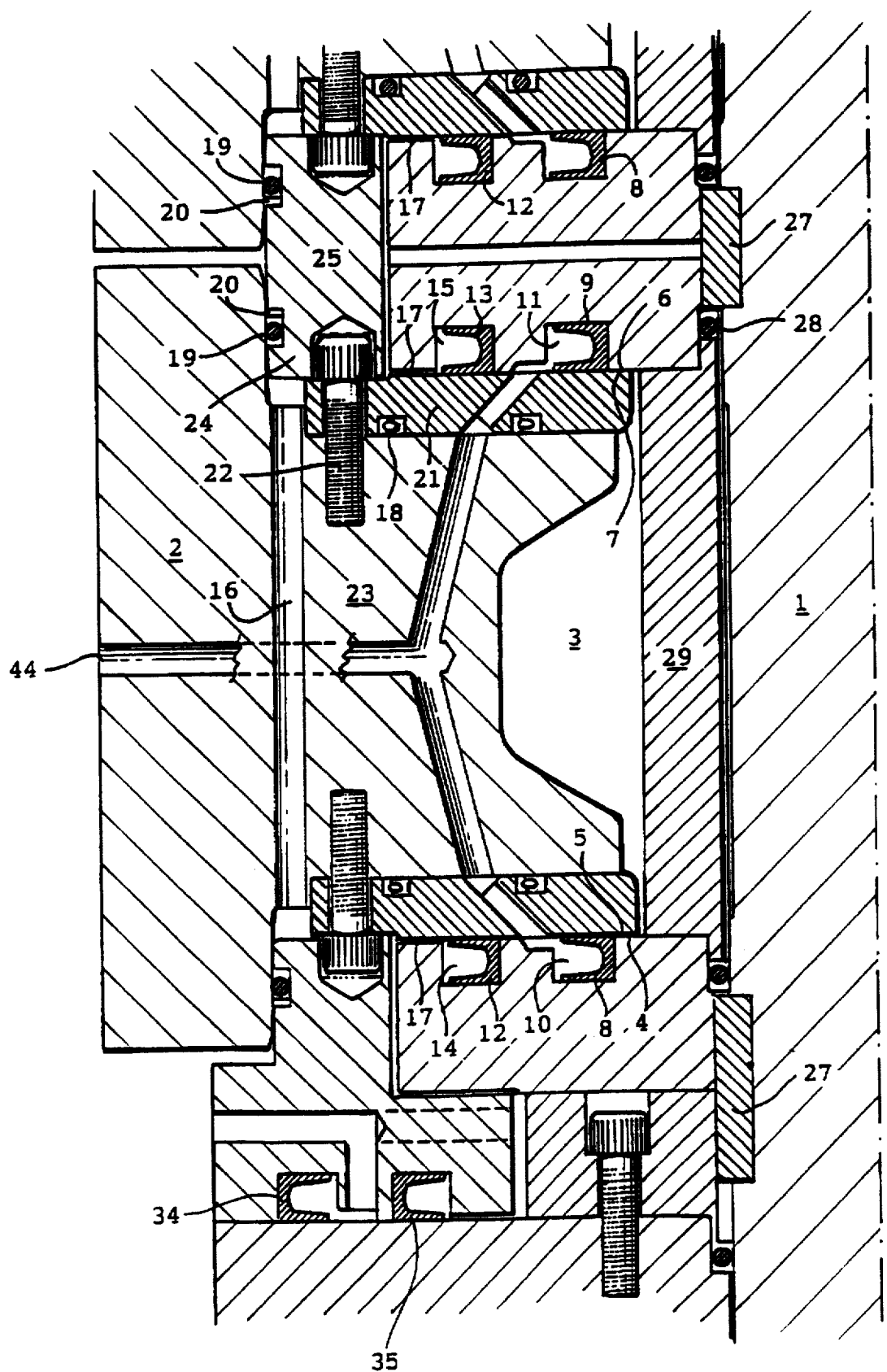
FIG. 4 is an enlarged view of a part of the segment of FIG. 3 showing the sealing means therefor in more detail.

FIG. 4 is an enlarged view of the sealing arrangement for a single segment and like parts are denoted by like reference numbers.

In addition FIG. 4 clearly shows environment seals 34 and 35 at the bottom and the top of the stack of modules of FIG. 1. These comprise a pair of spaced U-shaped sealing rings which seal the relatively rotatable surfaces at the top and bottom of the apparatus respectively from the external environment, which will generally be at atmospheric pressure.

These environment seals also comprise a pair of lip-seals having substantially U-shaped cross-sections and they are located in spaced grooves in one of the relatively rotatable surfaces. A barrier fluid under pressure is supplied to the open sides of each of these seals and typically the barrier fluid would be supplied at the same pressure as the barrier fluid for the primary and secondary joint seals. The environment seals operate in the same way as the dynamic seals but this time they are sealing against atmospheric pressure and therefore the outer seal 34 is effectively the operative primary seal. The barrier fluid pressure here will be substantially more than the environmental pressure (when this is atmospheric pressure) and this provides a very effective seal for this application. Nonetheless a secondary seal 35 is provided of substantially similar design and the secondary barrier fluid is supplied to this secondary seal. Because the same pressure is applied to the open side of seal 34 as to the open side of seal 35 then this secondary seal will again not be operable until or unless the primary seal fails.

When the primary seal does fail, there will be a leakage path for barrier fluid from the primary seal to escape to the atmosphere but the drop in pressure across the primary seal causes a pressure differential across the secondary seal 35 and activates the secondary seal.

Under normal circumstances this environment seal is an ultimate level of protection against product leakage from the production fluid conduits. Before the environment seal is needed, both the primary and secondary seals would need to fail in the segment or module at the top or bottom of the stack. Nonetheless, it is of course vitally important that a production fluid such as oil does not leak into the environment.

Figure 5:
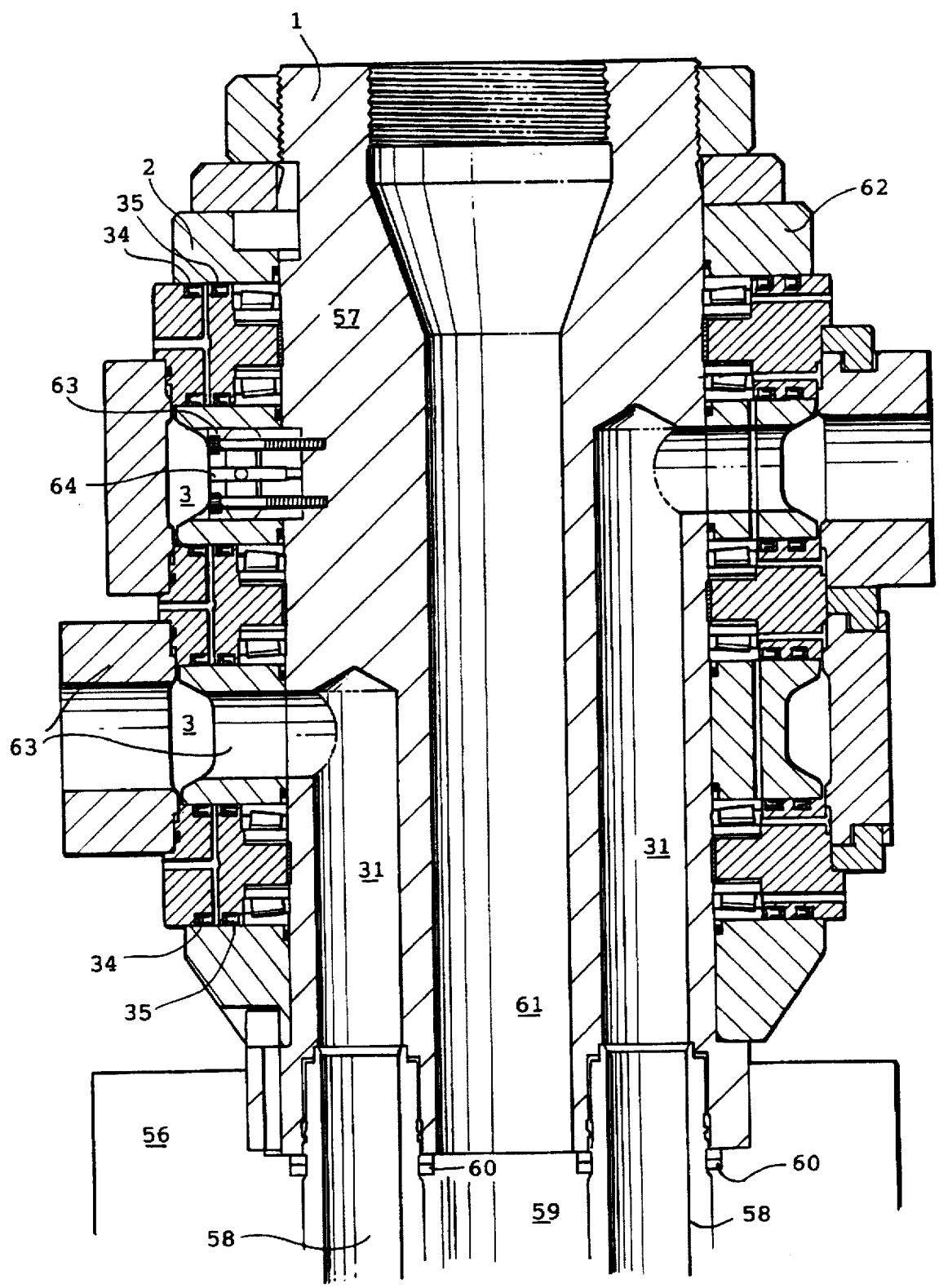
FIG. 5 is a cross-sectional view of a third embodiment of a fluid connector according to the invention.

FIG. 5 shows a lower, large diameter male connector 56 with an upper small diameter connector 57 stacked on top, each having a hollow central portion 59.

Each of these male connectors (56,57) has longitudinal bores for fluid transport which connect with respective radial passageways, annular grooves and conduits in co-operating female members, as has been described with reference to the FIGS. 1 and 3 above. The bores and passageways of lower connector 56 are not shown in FIG. 5. The bores 31 of the upper connector 57 connect to pipes 58 which are located in the hollow central part 59 of lower connector 56. Seals 60 are arranged at the junction of bores 31 and pipes 58 and these may be of any of a variety of known constructions.

The upper connector 57 also has a hollow central part 61. The upper and lower connectors 56,57 each have a solid core surrounding their hollow centres and through which the longitudinal bores are drilled for transport of fluid.

The upper and lower male connectors each have separate co-operating female connectors. In FIG. 5 the lower female connector is not shown but the upper one is indicated at 62.

The junction of the fluid carrying conduits between the male and female parts is sealed in a similar way to the system described for the embodiments of FIGS. 1 and 3, and is also described in applicant's co-pending and simultaneously filed application entitled "Sealing Arrangement" (FD37, PL77262GB). However, in FIG. 5 a different arrangement of the parts is used and this is illustrated in larger scale in FIG. 6 which is a cross-section through a part of one fluid conduit junction.

Figure 6:
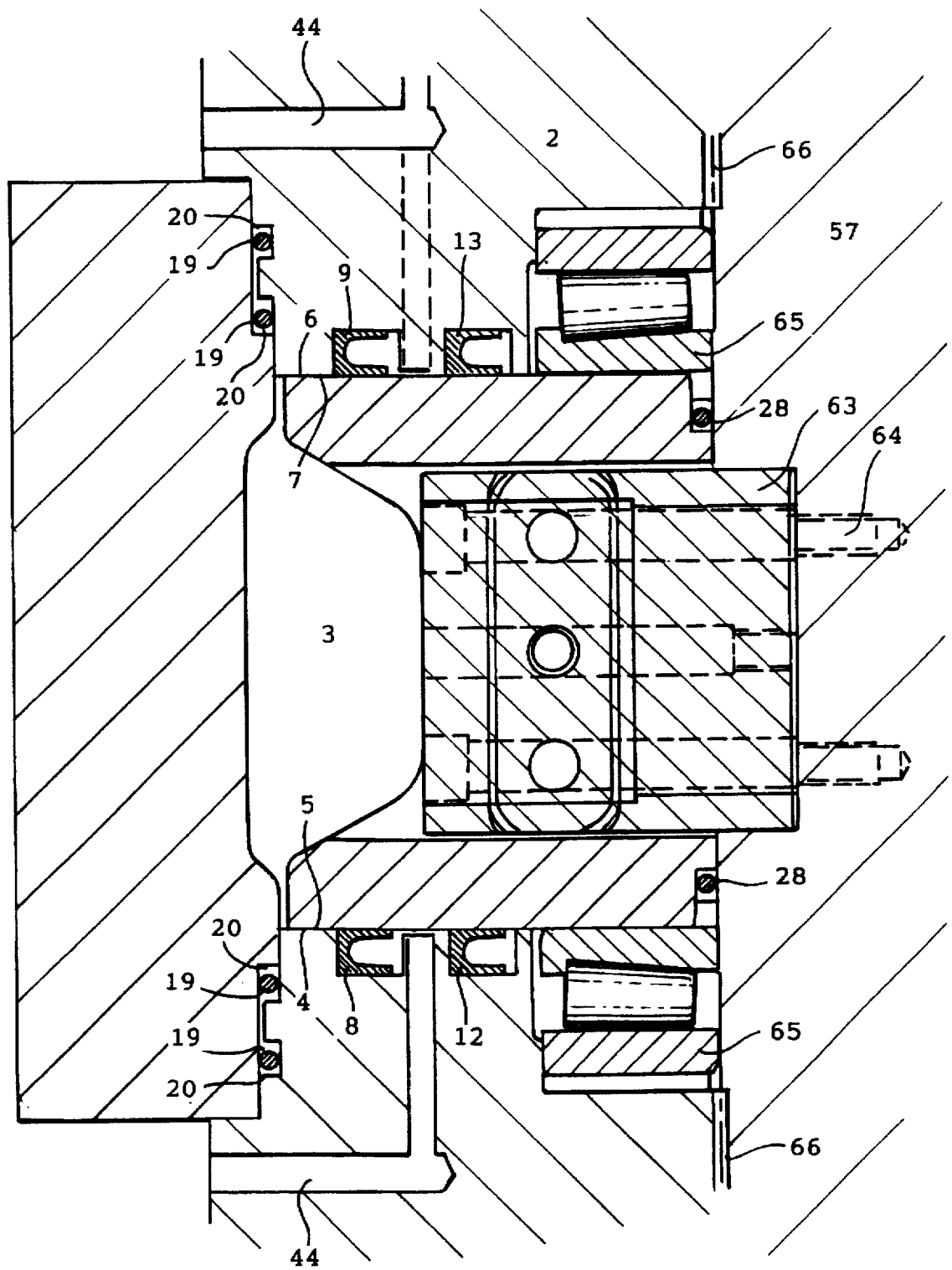
FIG. 6 is an enlarged view of a single segment of the fluid connector of FIG. 5.

The arrangement of parts at this junction will now be described in detail with reference to FIGS. 5 and 6.

The annular grooves 3 in the embodiment of FIG. 5 are formed between the female member 2 and key pieces 63 which are bolted to the core of male member 57 by bolts 64. This makes the male member 57 simpler to construct and the tolerances required for the fluid conduits are easier to achieve in these smaller individual parts.

Above and below each annular groove is a double sealing arrangement each comprising primary 8,9 and secondary 12,13 sealing rings in respective grooves. The sealing rings are lip seals with U-shaped cross-sections. They are arranged with the open arms facing away from the fluid path defined by annular groove 3. In this embodiment this is radially inwardly of the connector in contrast to the arrangement of the embodiments described above where the arms face radially outwardly (but still away from the fluid path).

These sealing rings seal the production fluid against leakage in the clearance between relatively moveable surface 4,5 below the groove 3 and 6 and 7 above. They are thus known as dynamic seals. They are activated by pressurised barrier fluid applied through channels 44 to the open side to create a pressure differential.

Roller bearings 65 are provided to assist the relative movement between surfaces 4 and 5 and between surfaces 6 and 7. Sliding or needle bearings 66 assist movement between facing vertical surfaces.

Static seals 28 comprising O-rings 19 and back-up plates 20 are also used in the connector as shown, but these are used between surfaces which have a fixed relationship to each other. These static seals may alternatively comprise U-shaped lip seals pressurised by barrier fluid supplied through drilled communication channels.

Environment seals 34,35 are arranged above and below each section of connector.

What I claim is:

1. An arrangement for connecting high pressure fluid-carrying conduits, the arrangement comprising:
   a central core with a fluid passage formed therein for carrying production fluid and
   an outer member coaxial with, and arranged to surround the central core and being rotationally moveable relative to the central core,
   said outer member comprising at least one segment having:
      a fluid flow conduit communicating with said central core fluid passage, and
      sealing means for sealing against leakage of production fluid at the junction between said conduit and said central core fluid passage:
         said sealing means comprising:
            an intermediate ring member;
            at least one static seal arranged between the intermediate member and said core; and
            at least one pressure activated dynamic seal interposed between relatively moveable surfaces of said intermediate member and said outer member;
   means for retaining said central core, outer member and intermediate ring member in coaxial relationship;
   means for supplying a barrier fluid, at a pressure higher than the pressure of the production fluid in the central core passage, to said pressure activated dynamic seal so that when the seals are activated said outer member is rotatable relative to the intermediate ring and the intermediate ring member is fixed relative to said central core.

2. The arrangement of claim 1 wherein the outer member comprises a plurality of segments, wherein each segment comprised means for connecting adjacent segments so as to allow limited relative motion between adjacent connected segments.

3. The arrangement of claim 2, wherein said dynamic sealing means comprises at least one sealing ring having sealing surfaces and said retaining means includes means for interconnecting each segment member with an adjacent segment member and intermediate member.

4. The arrangement of claim 3, wherein the interconnecting means is a bolt.

5. The arrangement claim 3 or 4, wherein the interconnecting means is adapted to allow relative motion between interconnected parts.

6. The arrangement of claim 2 comprising a shoulder portion on each segment and means for applying a compression force to the stacked segments in such a way as to act to retain the stacked segments in relative juxtaposition.

7. The arrangement of claim 6 comprising a distancing ring positioned radially inwardly of each segment and abutting a respective intermediate member wherein each distancing ring has cooperating shoulders for transferring the compression force between the segments.

8. The arrangement of claim 6, wherein each of said shoulder portions are positioned adjacent the central core.

9. The arrangement of claims 2 or 6 where each segment is separated from an adjacent segment by said intermediate member, and said intermediate member has grooves in which the dynamic sealing means is arranged, the location of each intermediate member relative to the central core being fixed.

10. The arrangement of claim 9, wherein each said intermediate member is fixed relative to the central core by said retaining means which includes a key located partly in a groove in said intermediate member and partly in a groove in said central core.

11. The arrangement of claim 10, wherein at least one of the static seals seals the intermediate member to the central core.

12. The arrangement of claim 11, wherein each said static seal comprises a U-shaped annular ring seal surrounding the central core.

13. The arrangement of claim 11, comprising fluid pressurising means for each said static seal.

14. The arrangement of claim 12 or 13 comprising a resilient expansion member between the arms of each of the U-shaped annular ring seals to push said arms outwardly of each other to tension each static seal.

15. The arrangement of claim 1, wherein the dynamic seals comprise differential pressure seals.

16. The arrangement of claim 1, wherein the static seals comprise O-rings seals.

17. The arrangement of claim 16 comprising backing plates on the lower pressure side of the O-ring seals.

18. The arrangement of claim 1 comprising bearings between relatively moveable surfaces.

19. The arrangement of claim 18, wherein the bearings are roller bearings.

20. The arrangement of claim 18, wherein the bearings are needle bearings.

* * * * *